United States Patent
Robinson

(10) Patent No.: US 8,112,604 B2
(45) Date of Patent: Feb. 7, 2012

(54) TRACKING LOAD STORE ORDERING HAZARDS

(75) Inventor: Eric F. Robinson, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 670 days.

(21) Appl. No.: 11/958,318

(22) Filed: Dec. 17, 2007

(65) Prior Publication Data

US 2009/0157943 A1 Jun. 18, 2009

(51) Int. Cl.
*G06F 13/14* (2006.01)
(52) U.S. Cl. ........... 711/169; 711/154; 711/E12.031; 712/218; 712/E9.033
(58) Field of Classification Search .............. 711/154, 711/156, 169, E12.033; 712/218, 219, 225, 712/E9.033
See application file for complete search history.

(56) References Cited

U.S. PATENT DOCUMENTS

| | | | |
|---|---|---|---|
| 5,465,336 A | 11/1995 | Imai et al. | |
| 5,621,896 A | 4/1997 | Burgess et al. | |
| 5,809,530 A | 9/1998 | Samra et al. | |
| 6,011,908 A * | 1/2000 | Wing et al. ................ | 714/19 |
| 6,021,468 A | 2/2000 | Arimilli et al. | |
| 6,163,821 A | 12/2000 | Keller et al. | |
| 6,237,067 B1 | 5/2001 | Eberhard et al. | |
| 6,393,536 B1 * | 5/2002 | Hughes et al. .............. | 711/159 |
| 6,460,133 B1 | 10/2002 | Nunez et al. | |
| 6,481,251 B1 | 11/2002 | Meier et al. | |
| 6,591,342 B1 | 7/2003 | Akkary et al. | |
| 6,877,077 B2 * | 4/2005 | McGee et al. ............... | 711/158 |
| 6,963,967 B1 * | 11/2005 | Guthrie et al. .............. | 712/225 |
| 7,003,648 B2 | 2/2006 | Chrysos et al. | |
| 7,089,364 B2 | 8/2006 | Arimilli et al. | |
| 7,689,813 B2 * | 3/2010 | Caprioli et al. ............ | 712/219 |
| 2002/0056022 A1 | 5/2002 | Leung | |
| 2003/0196035 A1 * | 10/2003 | Akkary ...................... | 711/108 |
| 2003/0196075 A1 | 10/2003 | Akkary et al. | |
| 2005/0251622 A1 | 11/2005 | Arimilli et al. | |
| 2006/0129764 A1 | 6/2006 | Bellows et al. | |
| 2006/0143373 A1 * | 6/2006 | Jain et al. .................. | 711/108 |
| 2006/0179226 A1 | 8/2006 | Guthrie et al. | |
| 2008/0082738 A1 * | 4/2008 | Cypher et al. ............. | 711/108 |
| 2009/0157944 A1 | 6/2009 | Robinson | |

OTHER PUBLICATIONS

USPTO office action for U.S. Appl. No. 11/958,328 dated Sep. 15, 2010.

* cited by examiner

*Primary Examiner* — Pierre-Michel Bataille
*Assistant Examiner* — Hal Schnee
(74) *Attorney, Agent, or Firm* — Yee & Associates, P.C.; Yuanmin Cai

(57) ABSTRACT

A method and system for processing data. In one embodiment, the method includes receiving a plurality of stores into a store queue, where each store is a result from a processor, and where the plurality of stores are destined for at least one memory address. The method also includes marking a most recent store of the plurality of stores for each unique memory address, comparing a load request against the store queue, and identifying only the most recent store for each unique memory address for the purpose of handling load-hit-store ordering hazards.

12 Claims, 6 Drawing Sheets

200

300

TRACKING LOAD STORE ORDERING HAZARDS

FIELD OF THE INVENTION

The present invention relates to computer systems, and more particularly to data processing.

RELATED CO-PENDING PATENT APPLICATIONS

The present invention is related to a co-pending U.S. application, Ser. No. 11/958,328, filed on Dec. 17, 2007, and entitled "Tracking Store Ordering Hazards In An Out-Of-Order Store Queue," which is herein incorporated by reference.

BACKGROUND OF THE INVENTION

A processor (also commonly referred to as a central processing unit (CPU)) is a component in a computer that executes instructions of a program. In general, processor instruction execution may be broken down into three main tasks: 1) loading (or reading) data into registers from memory (e.g., a cache); 2) performing arithmetic operations on the data; and 3) storing (or writing) the results of the arithmetic operations to memory or input/output (I/O).

Of the tasks above, the first task—loading data (where data that is loaded from memory referred to as a "load") into registers from memory—has the most impact on processor performance as the second task cannot begin until the first task is complete. The third task—storing results (where data that is stored to memory is referred to a "store") to memory or I/O—is the most flexible as to the latency of its completion. Thus, when both a load and a store simultaneously attempt to access a cache during a same processor execution cycle, the load is typically allowed access to the cache, while the store must wait for a next processor execution cycle. Accordingly, in a circumstance in which multiple loads need to access a cache, a store may have to wait a few processor execution cycles before being granted access to the cache. Stores are therefore typically stored in a queue (commonly referred to as a "store queue") while the stores wait for access to the cache.

In processor designs, a store queue can be a FIFO (First In, First Out) or a non-FIFO. Non FIFO store queues (also referred to as "out of order (OoO) store queues") permit younger (newer) stores to be retired (i.e., data associated with the store is written into cache) before older stores are retired. Out of order store queues introduce additional complexity relative to FIFO store queues, but typically yield higher performance. For example, if the retirement of a particular store needs to be delayed for some reason, an out of order store queue may retire a younger store as long as there is no data ordering dependency between the delayed store and the younger store.

In some situations, two stores may be going to the same (cache) address and therefore the two stores must be retired in a particular order with respect to each other. In addition, the two stores may still be retired out of order relative to other stores in the store queue. In an out-of-order case, the younger store sets a dependency vector bit to indicate a dependency with a corresponding older store. During each processor execution cycle, the store performs a reduction OR operation across its dependency vector bits; if any of the dependency vector bits is set (e.g., equal to 1), then the store must wait for a next processor execution cycle for retirement. In some situations, a particular store must wait for a plurality of older stores to retire before the store can be retired—e.g., a sync or a store that may be going to the same address as several other stores in the store queue. In such cases, a younger store sets a dependency vector bit for each older store that must be retired prior to the store. As the older stores are retired, the corresponding dependency vector bits are cleared, and when a reduction OR finds that no dependency vector bits are set, the store is eligible to be retired.

As long as a store remains valid in the store queue (STQ), the store data typically has not yet been written to the cache. If the processor were to send a load request for any byte addresses that are valid in the STQ, then the load must not be allowed to satisfy its request from the cache. Although the cache may report a 'hit' for the line address targeted by the load, the data it contains is stale if the store queue has any bytes for that line; any data that may be found in the STQ is always newer than data in the cache. And so, when a load comes along, it typically performs address compares against the valid, older entries in the STQ to determine whether it may use the data that the cache contains or whether it must wait for a store to complete before it may satisfy its request.

There are various means used to detect and to track load-store ordering hazards. If the store queue (STQ) always retires (i.e., completes) stores in age order, the load queue (LDQ) may force every new load to wait for the most recent store in the STQ to complete by just remembering the most recently allocated STQ entry; when that entry is retired, any potential hazard the load would have had is guaranteed to have been resolved. However, this method penalizes all loads, not just loads that have an ordering hazard with a store.

Alternatively, a second method is for the LDQ to make a new load wait for the most recent store if the load has an ordering hazard with any store in the STQ. This allows better performance than the previously described method because only loads that have actual hazards need be delayed by the STQ. However, this method causes a load to wait longer than it may otherwise need to wait because it waits for the most recent store, even when its hazard is the oldest store in the STQ.

Alternatively, a third method is for the LDQ to wait for the youngest STQ entry that it has an ordering hazard with. This offers still better performance than the previously described methods. However, in the case of the load having an ordering hazard with multiple STQ entries, the hazard logic must endure the complexity of assigning a compare result priority based on the age of the STQ entry relative to the other entries in order for the load to know which STQ entry must retire before it may continue.

A fourth method is for the LDQ to continue retrying the load until it no longer detects the ordering hazard with the STQ. This offers reduced complexity versus the second and the third methods described above. However, this is not energy efficient because the loads keep cycling around until the ordering hazard resolves, and this may reduce the throughput of stores from the STQ because each time a load retries it potentially prevents a store from accessing the cache due to the higher relative priority usually assigned to loads versus stores.

If the STQ allows stores to retire out of order (OoO) with respect to each other if to different target addresses, the LDQ's options for tracking load-vs-store ordering hazards are more limited. Because the LDQ does not know whether the youngest store in the STQ at the time of the load's arrival will be the last STQ entry to retire, the LDQ is not able to use any of the in-order STQ methods that rely on the most recent store to enter the STQ. The LDQ may retry the load until it no longer detects the ordering hazard with the STQ. This offers reduced complexity versus the second and the third methods described above. However, this is not energy efficient because the loads keep cycling around until the ordering hazard resolves, and this may reduce the throughput of stores from the STQ because each time a load retries it potentially prevents a store from accessing the cache due to the higher relative priority usually assigned to loads versus stores.

Accordingly, what is needed is an improved method and system for processing data. The present invention addresses such a need.

SUMMARY OF THE INVENTION

A method and system for processing data is disclosed. In one embodiment, the method includes receiving from a processor a plurality of stores into a store queue, where each store is a result from an execution unit, and where the plurality of stores are destined for at least one memory address. The method also includes marking the most recent store of the plurality of stores for each unique memory address, comparing a load request against the store queue, and identifying only the most recent store for each unique memory address. According to the system and method disclosed herein, embodiments are area and power efficient, and are also scalable.

DETAILED DESCRIPTION OF THE INVENTION

The present invention relates to computer systems, and more particularly to data processing. The following description is presented to enable one of ordinary skill in the art to make and use the invention, and is provided in the context of a patent application and its requirements. Various modifications to the preferred embodiment and the generic principles and features described herein will be readily apparent to those skilled in the art. Thus, the present invention is not intended to be limited to the embodiments shown, but is to be accorded the widest scope consistent with the principles and features described herein.

A method and system in accordance with the present invention for processing data is disclosed. The method includes receiving stores into a store queue, where each store is a memory (or cache) write from a processor, and where the stores are destined for a same memory address. Instead of using any of the methods described above for load-vs-store dependency detection and tracking, the STQ marks the most recent store. When a load request arrives, the load request is compared against the valid entries in the STQ and identifies only the most recent store with which it has an ordering hazard. The load may proceed once that marked store retires. As a result, the need for continual load retries is eliminated, and the LDQ does not need to determine age order among multiple matching STQ entries and does not need to suffer from the lower performance of waiting for the STQ to drain all pre-existing entries at the time the load arrived. To more particularly describe the features of the present invention, refer now to the following description in conjunction with the accompanying figures.

Figure 1:
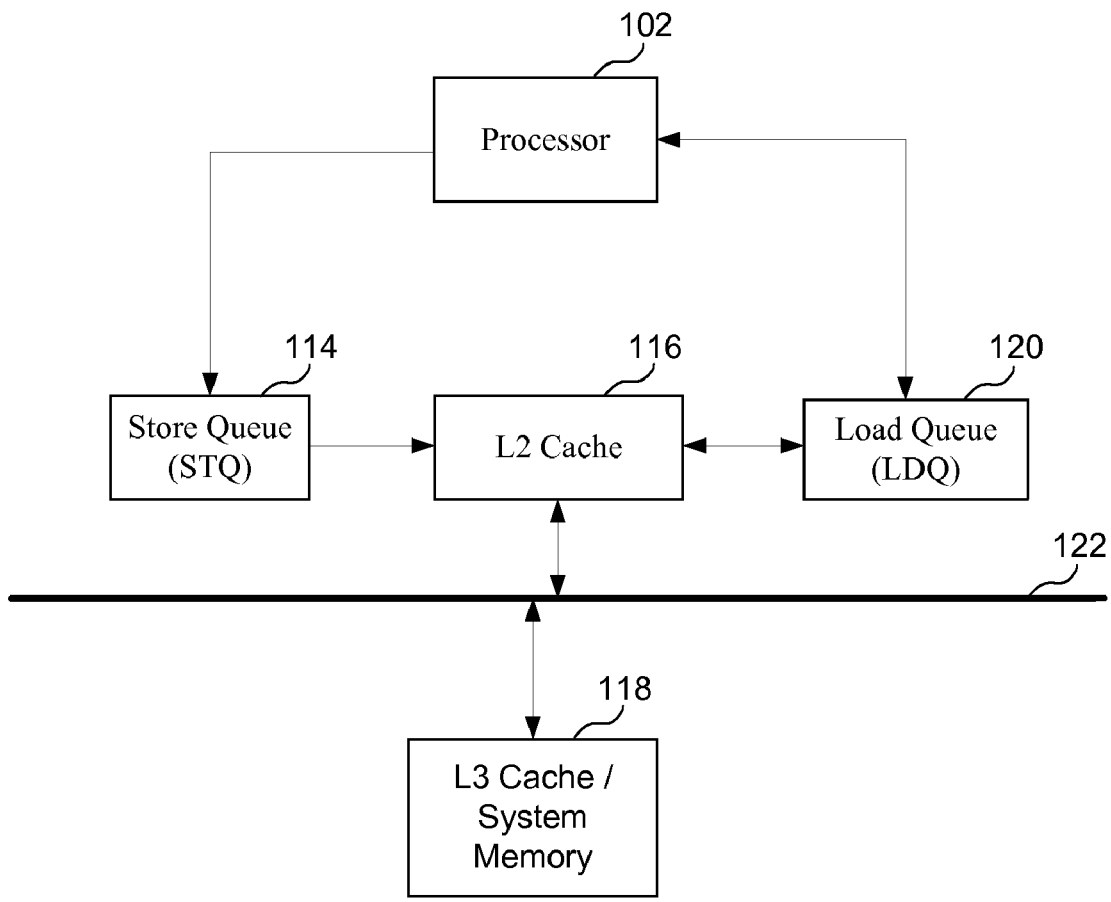
FIG. 1 is a high-level block diagram of a computer system according to one embodiment of the present invention.

FIG. 1 is a high-level block diagram of a computer system 100 according to one embodiment of the present invention. As FIG. 1 shows, the computer system 100 includes a processor 102, a store queue (STQ) 114, an L2 cache 116, a load queue (LDQ) 120, a system bus 122, and an L3 cache/system memory 118.

In operation, the processor 102 reads from and writes to the L2 cache 116. When both a load and a store simultaneously attempt to access the L2 cache 116 during a same processor execution cycle, the load is typically allowed access to the cache, while the store must wait for a next processor execution cycle. Accordingly, stores are stored in the store queue 114 while the stores wait for access to the L2 cache 116. Sometimes, a load must wait to access the L2 cache 116. For example, if there is an older store in the STQ 114 that contains some of the bytes that the load needs, then the load must wait for the store to complete before it proceeds to read the cache. When this occurs, the load waits in the LDQ 120 for the store to complete. Sometimes the data that's needed by a load or a store is not in the L2 cache 116. When this occurs, the data is brought into the cache from system memory 118. System communication bus 122 performs the data transfers between the units attached, such as L2 cache 116 and system memory 118.

In operation, in one embodiment, the store queue 114 and the load queue 120 receive a new load request address. If a load-hit-store hazard is detected, the STQ 114 informs the LDQ 120 which store queue 114 entry to wait for. When the STQ 114 determines that an entry may be retired, it informs the load queue 120 which store queue 114 entry is retiring. The load queue 120 sends a load request to the L2 cache 116 or to the system bus 122 if the target data is not in the L2 cache 116.

In one embodiment, the store queue 114 properly maintains or resolves the ordering between stores (store versus store ordering) as needed. The store queue 114 also maintains an order between store entries going to the same address. As described in more detail below, the store queue 114 tracks which store for a given address is the youngest (newest) store in the store queue 114 at any given time. In one embodiment, the newest store for each address (e.g., cache line address) is marked in such a way that when a load is compared against the store queue 114, it will find, at most, a single matching store queue 114 entry (i.e., the youngest store for that address).

In the case of the youngest entry in the store queue 114 being a synchronizing operation, that entry that will be marked as such, and the address compare will be forced to match. The load will then capture a pointer to the store queue 114 entry that it must wait for (by encoding the compare results, of which there may be, at most, a single match). As each store entry retires, its pointer will be broadcast to the load queue. When the load queue detects the retirement of the store for which the load queue is waiting, the load queue can then proceed to load the data from the L2 cache 120 or from system memory 118.

In the example above, the load queue 120 only needs storage for a pointer (e.g., 5 bits) and a load-store hazard indication (e.g., 1 bit), and the storage queue 114 needs an indication per entry indicating that it is the newest store for its address.

Recent Load Bit

In one embodiment, each store queue entry includes a recent load (RL) bit. In one embodiment, when the RL bit is set (e.g., RL=1), it signifies that the store queue entry has the most recent update for a particular cache line address or is the most recent synchronizing operation for which a load would need to wait.

In one embodiment, when the store queue 114 allocates a store queue entry to a given cache line, the RL bit for that store queue entry is set because the store queue entry is now the most recent store for the cache line. If there is an older store queue entry to the same cache line, then its RL bit is cleared because only one store queue entry may be the most recent for any given cache line address.

Figure 2:
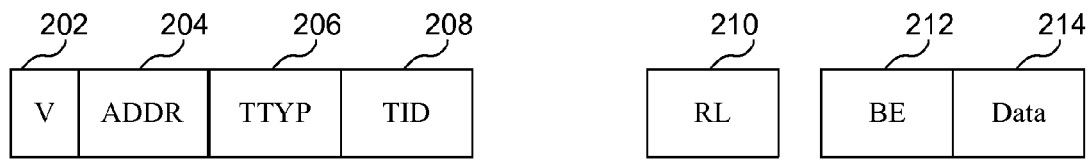
FIG. 2 is a block diagram of a store queue entry in accordance with one embodiment of the present invention.

FIG. 2 is a block diagram of a store queue entry 200 in accordance with one embodiment of the present invention. In one embodiment, the store queue entry 200 includes a valid bit field (V) 202 that indicates whether the store is valid, an address field (ADDR) 204 that contains a target address of the store, a command field (TTYP) 206 that indicates a type of the store (e.g., normal store, synchronizing store, etc.), and a thread ID field (TID) 208 that indicates a thread ID corresponding to the store.

In one embodiment, the store queue entry 200 also includes a recent load field (RL) 210 that indicates that the entry is the most recent store for which a load would need to wait, for the purposes of load-versus-store ordering (e.g. this entry has newest store for its line or, if a synchronizing store, this is the entry for which all newer loads must wait), a byte enable field (BE) 212 that indicates which bytes of the data field contain actual data to be stored, and a data field (Data) 214 that includes the data associated with the store.

Figure 3:
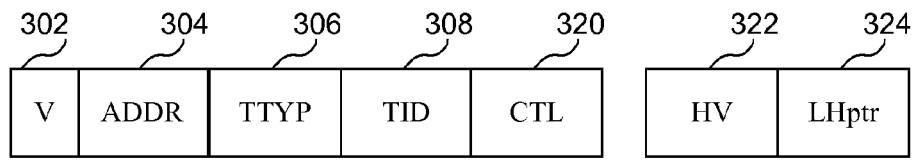
FIG. 3 is a block diagram of a load queue entry in accordance with one embodiment of the present invention.

FIG. 3 is a block diagram of a load queue entry 300 in accordance with one embodiment of the present invention. In one embodiment, the load queue entry 300 includes a valid bit field (V) 302 that indicates whether the load is valid, an address field (ADDR) 304 that contains a target address of the load, a command field (TTYP) 306 that indicates a type of the load (e.g., normal load, prefetch, instruction fetch, etc), a thread ID field (TID) 308 that indicates a thread ID corresponding to the load, and a control field (CTL) 320 for miscellaneous control bits.

In one embodiment, the load queue entry 300 also includes a hazard field (HV) 322 and a load hazard pointer 324. In one embodiment, the HV 322 indicates that a load-store ordering hazard exists, which means that the load needs to wait for the store pointed to by a load hazard pointer 324 to retire before the load can proceed.

Figure 4:
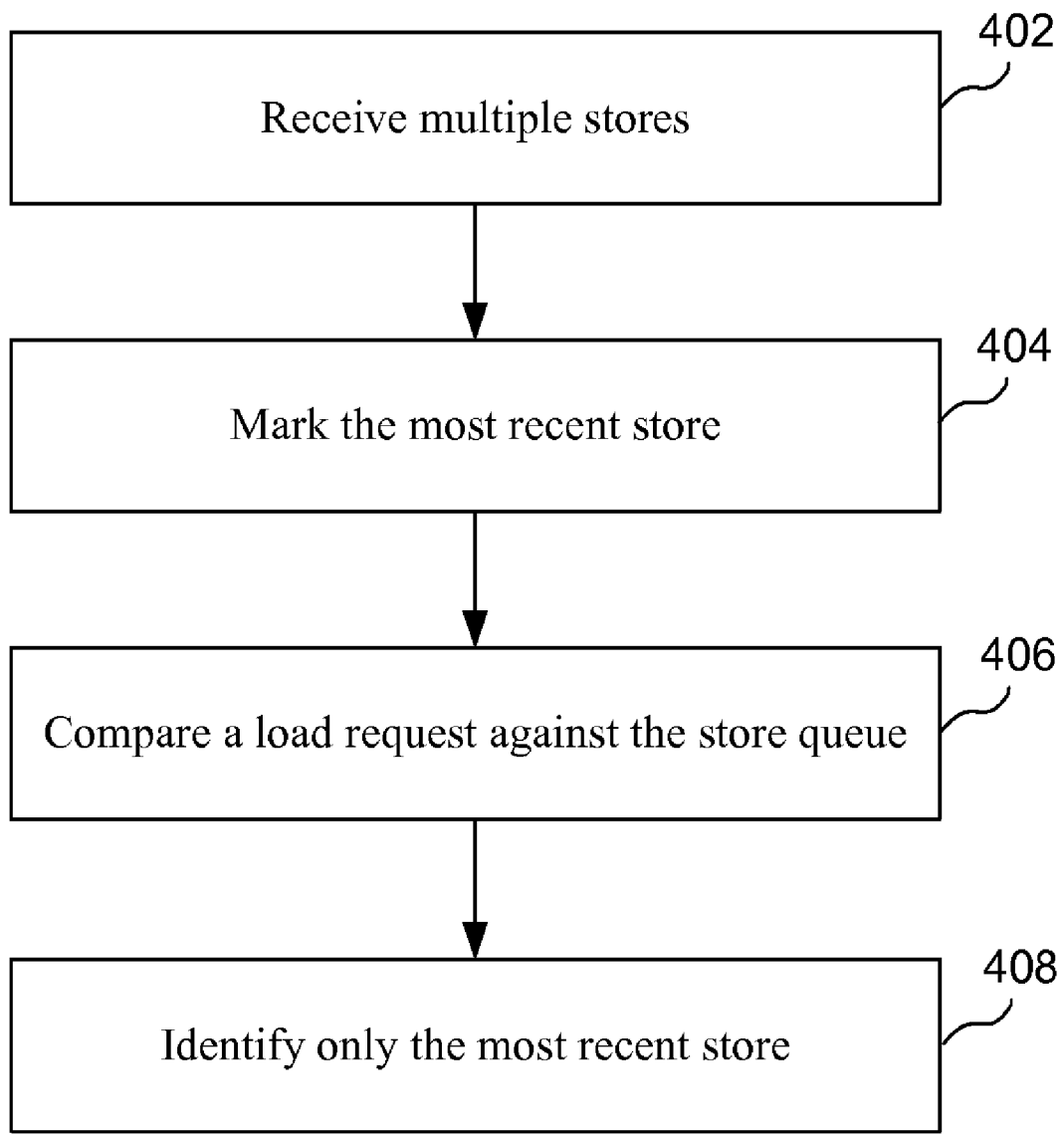
FIG. 4 is a flow chart showing a method for processing data in accordance with one embodiment of the present invention.

FIG. 4 is a flow chart showing a method for processing data in accordance with one embodiment of the present invention. Referring to both FIGS. 1 and 4, the process begins in step 402 where the store queue 114 receives multiple stores, where each store is a result from the processor 102, and where the stores are destined for one or more memory addresses. Next, in step 404, the STQ 114 marks the most recent store of the plurality of stores for each unique memory address by setting RL bit 210. Next, in step 406, the STQ 114 compares a load request against the valid entries in store queue 114 that are marked as "most recent." Next, in step 408, the STQ 114 identifies only the most recent store for each unique memory address for which the load must wait.

Figure 5:
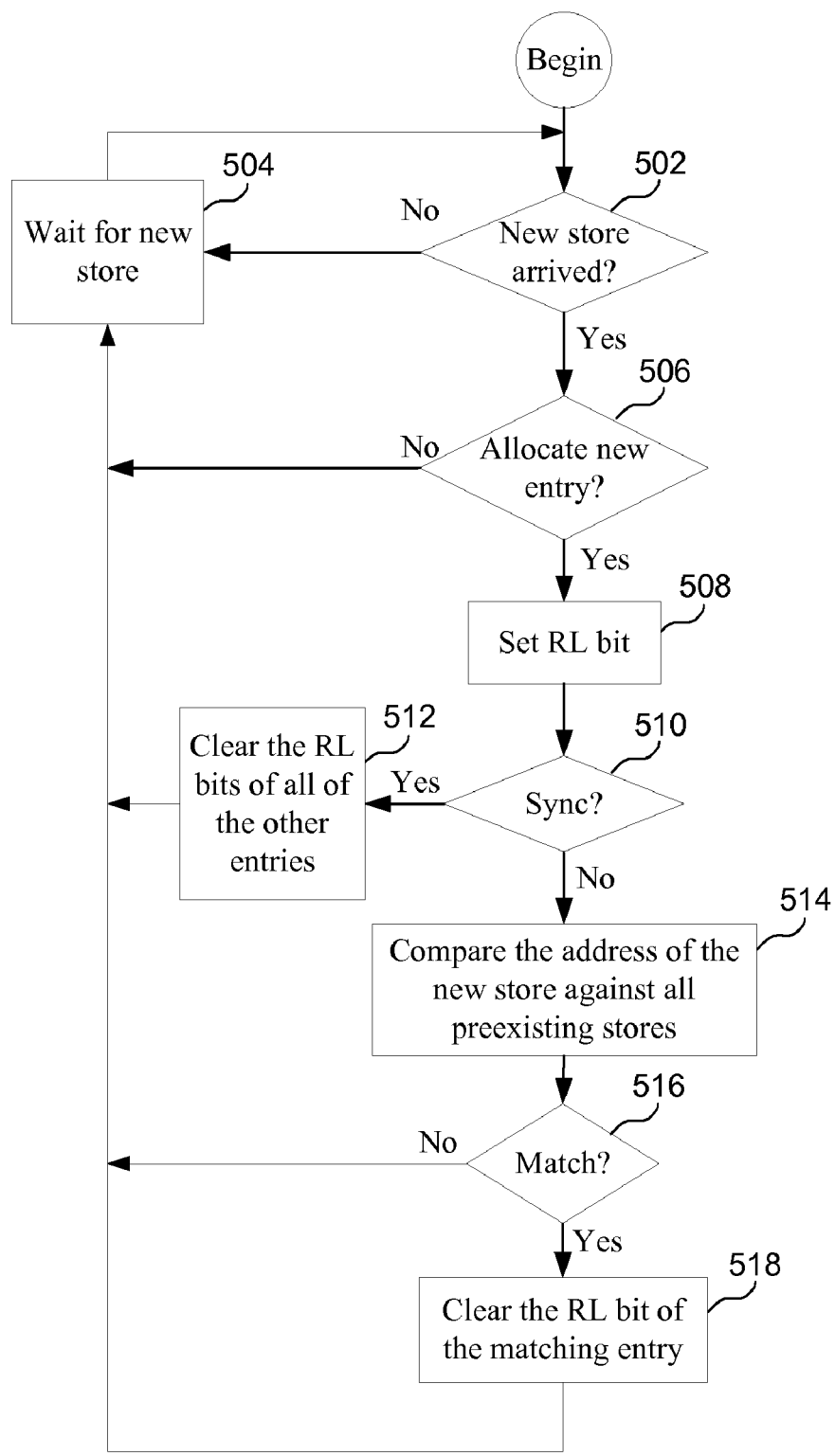
FIG. 5 is a flow chart showing a method for ordering stores in accordance with one embodiment of the present invention.

FIG. 5 is a flow chart showing a method for ordering stores in accordance with one embodiment of the present invention. Referring to both FIGS. 1 and 5, the process begins in step 502 where the store queue 114 determines if a new store has arrived at the store queue 114. If not, in step 504, the store queue 114 waits for a new store to arrive. If a new store has arrived at the store queue 114, in step 506, the store queue 114 determines if it needs to allocate a new entry. If not, in step 504, the store queue 114 waits for a new store to arrive. If the store queue 114 needs to allocate a new entry, in step 508, the store queue 114 allocates a new entry 200 and sets the RL bit 210 of the new entry.

Next, in step 510, after receiving a new store request, the store queue 114 determines if the new store request is a request associated with a synchronizing operation. In the case of a synchronizing operation, the store queue entry is the most recent store operation. If the new store request is a request associated with a synchronizing operation, in step 512, the store queue 114 clears the RL bits 210 of all of the other entries and then waits for a new store. If the new store is regular store, the RL bits 210 of all older stores for same cache line are cleared regardless of the thread, such that the new store's RL bit 210 is the only store's RL bit 210 that is set. In one embodiment, the store queue 114 may sit in step 504 waiting for a new store, but as long as there is a synchronizing operation in the store queue 114, the processor will not send another store for that thread until the synchronizing operation leaves the store queue 114.

If the new store request is not a request associated with a synchronizing operation, in step 514, the store queue 114 compares the address of the new store against all preexisting stores (older stores) with valid store queue entries (e.g., where RL=1).

Next, in step 516, the store queue 114 determines if the address matches any of the preexisting entries. If there is no match, the store queue 114 waits for a new store to arrive. If there is a match, in step 518, the store queue 114 clears the RL bit 210 of the matching entry, and then waits for a new store to arrive.

Load Store Ordering Hazard

As long as a store remains valid in a store queue, data associated with the store typically has not yet been written into cache. If a processor were to send a load request for any byte addresses that are valid in the store queue, then the processor must be prevented from satisfying the load request from the cache. Although the cache may report a "hit" for a line address targeted by the load request, the data contained in the cache is stale—i.e., data contained in the store queue is always newer than the data contained in the cache. Thus, a load generally must perform address comparisons with valid stores contained in a store queue to determine whether the load can safely use data contained within a cache or whether the load must wait for a store to complete before the load may be satisfied from the cache.

Figure 6:
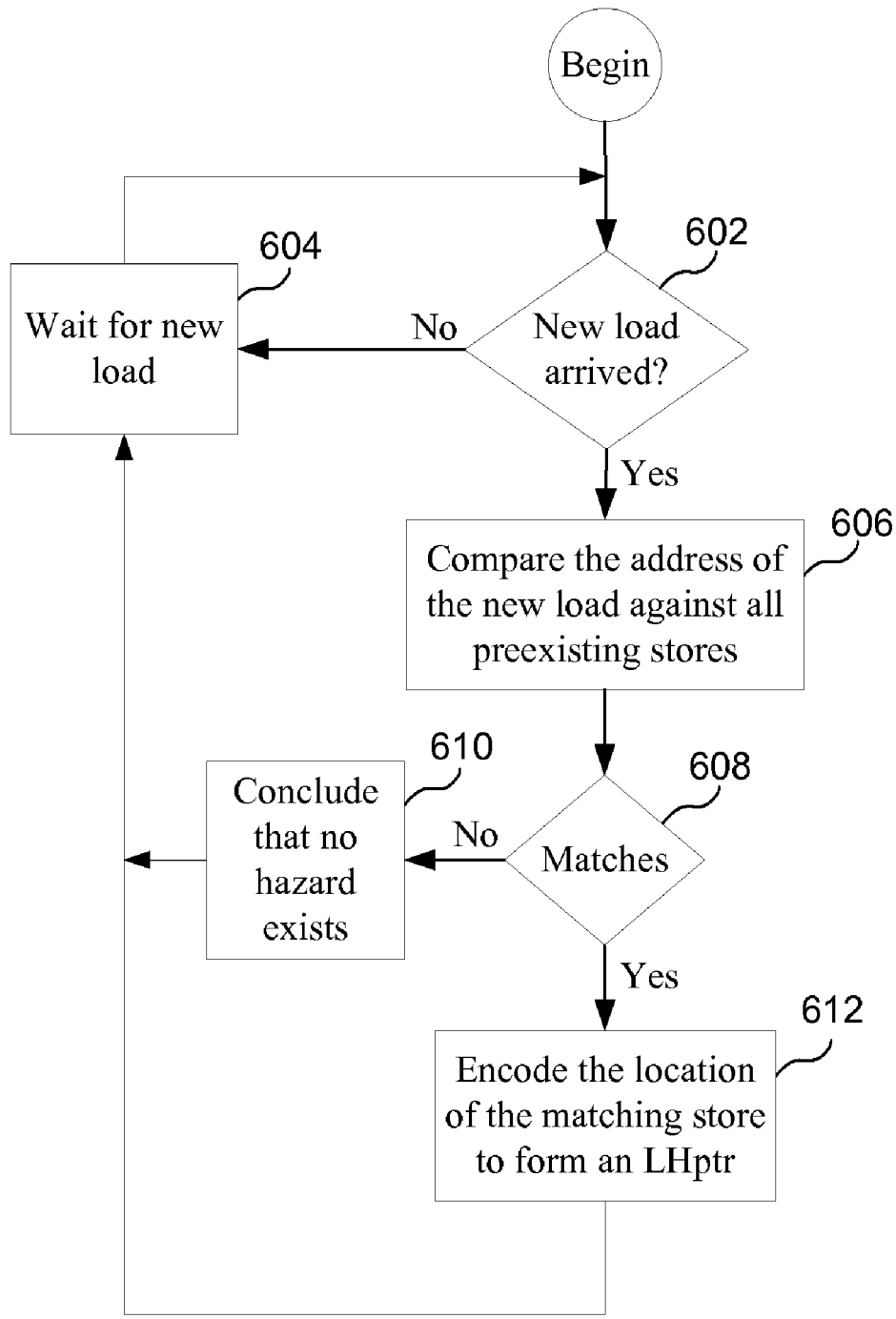
FIG. 6 is a flow chart showing a method for setting up load dependency tracking in accordance with one embodiment of the present invention.

FIG. 6 is a flow chart showing a method for setting up load dependency tracking in accordance with one embodiment of the present invention. Referring to both FIGS. 1 and 6, the process begins in step 602 where the store queue 114 determines if a new load has arrived at the load queue 120. If not, in step 604, the store queue 114 waits for a new load to arrive.

If a new load has arrived at the store queue 114, in step 606, the store queue 114 compares the address of the new load against all preexisting stores in the store queue 114 with valid store queue entries (e.g., where RL=1). A benefit of this is that it saves power versus performing a compare operation against all valid entries.

Next, in step 608, the store queue 114 determines if there are any matches. If there is no match, in step 610, the store queue 114 concludes that no hazard exists and does not set the hazard field (HV) bit 322. The store queue 114 then waits for a new load to arrive in step 604.

If there is a match, in step 612, the store queue 114 encodes the location of the matching store (or of the sync with an RL=1) 200 to form a load hazard pointer (LHptr 324) to the store queue entry that must retire before the load is allowed to proceed. The load hazard pointer is saved for this load 300 in the load queue 120. In one embodiment, the store queue 114 also causes the load queue 120 to set the HV bit 322 for the load. In one embodiment, the load may match at most one store queue entry. The store queue 114 then waits for a new store to arrive.

Figure 7:
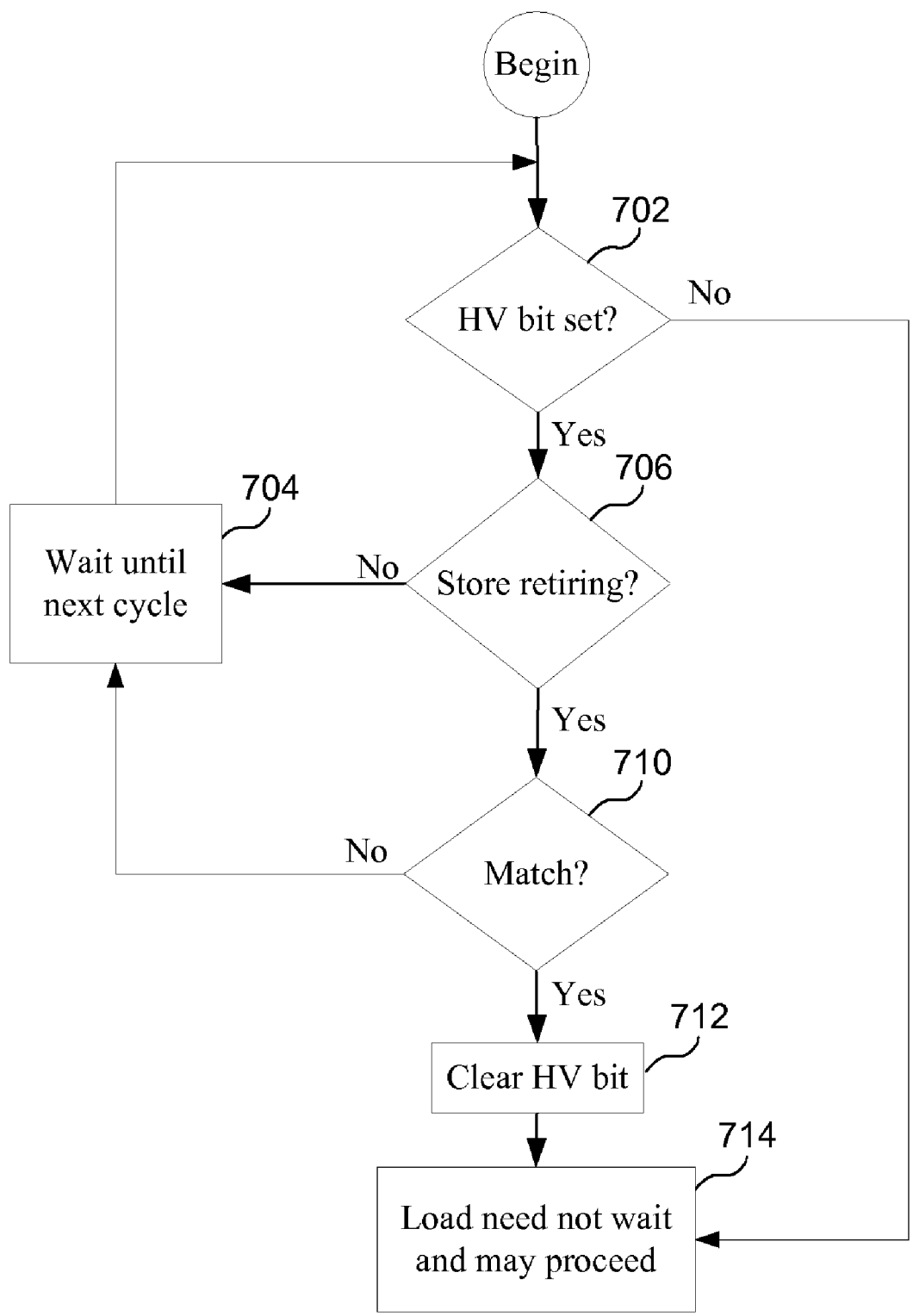
FIG. 7 is a flow chart showing a method for determining when a load may proceed in accordance with one embodiment of the present invention.

FIG. 7 is a flow chart showing a method for determining when a load may proceed in accordance with one embodiment of the present invention. Referring to both FIGS. 1 and 7, the process begins in step 702 where the load queue 120 determines if the HV bit 322 is set. If not, in step 714, the load queue 120 concludes that a hazard does not exist and that the load need not wait for a store and the load may proceed.

If the HV bit 322 is set, in step 706, the load queue 120 determines if a store is retiring in the current cycle. If not, the load queue 120 proceeds to step 704 where it waits until the next cycle.

If a store is retiring in the current cycle, in step 710, the load queue 120 determines if the STQ 114 entry number matches the load hazard pointer, LHptr 324, for this load. If not, the load queue 120 proceeds to step 704 to wait until the next cycle.

If the retiring STQ entry number matches a load hazard pointer LHptr 324 for this load, in step 712, the LDQ 120 clears the HV bit 322 for the load 300. The LDQ 120 then concludes that the load 300 need not wait for a store and may proceed.

According to the method and system disclosed herein, the present invention provides numerous benefits. For example, embodiments are area and power efficient. Embodiments are also scalable.

A method and system in accordance with the present invention for processing data have been disclosed. The method includes receiving stores into a store queue, where each store is a result from a processor, and where the stores are destined for a same memory address. A store queue unit marks the most recent store. When a load request arrives, the load request is compared against the store queue and identifies only the most recent store. The load may proceed once that marked store retires. The method employed by the store queue to retire store queue entries (e.g., FIFO, non-FIFO) has no effect on the operation of that load as long as the store queue lets the load know when the marked store retires.

The present invention has been described in accordance with the embodiments shown. One of ordinary skill in the art will readily recognize that there could be variations to the embodiments, and that any variations would be within the spirit and scope of the present invention. For example, embodiments of the present invention may be implemented using hardware, software, a computer-readable medium containing program instructions, or a combination thereof. Software written according to the present invention or results of the present invention may be stored in some form of computer-readable medium such as memory, hard drive, CD-ROM, DVD, or other media for subsequent purposes such as being executed or processed by a processor, being displayed to a user, etc. Also, software written according to the present invention or results of the present invention may be transmitted in a signal over a network. In some embodiments, a computer-readable medium may include a computer-readable signal that may be transmitted over a network. Accordingly, many modifications may be made by one of ordinary skill in the art without departing from the spirit and scope of the appended claims.

What is claimed is:

1. A method comprising:
   receiving a plurality of stores into a store queue, wherein each store is a result from a processor, and wherein the plurality of stores are destined for at least one memory address;
   determining whether a new store received at the store queue is a synchronizing operation;
   in response to determining that the new store is not a synchronizing operation, determining that the new store has a memory address that matches a memory address of a store that is present in the store queue; and
   thereafter, marking the new store as a most recent store for the memory address to form a set of marked stores, wherein each unique memory address referenced by a store in the store queue has only one marked store indicating that the only one marked store is the most recent store for a unique memory address and wherein marking the new store as the most recent store for the memory address comprises:
   setting a new recent load bit that, when set, indicates the most recent store; and
   clearing an old recent load bit for all other stores having a same unique memory address such that only one store has a recent load bit set for each unique memory address;
   in response to determining that the new store is a synchronizing operation, setting a new recent load bit for the synchronizing operation and clearing old recent load bits for all other stores in the store queue, such that the set of marked stores consists of only the synchronizing operation;
   receiving a load request in a load queue;
   thereafter, comparing an address in the load request against addresses for only the set of marked stores in the store queue;
   identifying that the address in the load request matches a matching store in the set of marked stores;
   thereafter, setting a hazard bit associated with the load request and encoding a location of the matching store in the load queue for the load request to form a hazard pointer, wherein the load request will not be processed when the hazard bit is set;
   detecting a retiring store in the plurality of stores retiring;
   thereafter, comparing the hazard pointer with the retiring store; identifying that the hazard pointer matches the retiring store; and
   thereafter, clearing the hazard bit.

2. The method of claim 1, wherein marking the new store as the most recent store for the memory address further comprises:
   setting a recent load bit, wherein the recent load bit, when set, indicates the most recent store that a load would need to wait for in order to proceed.

3. The method of claim 1 further comprising:
   identifying that the hazard bit is set;
   thereafter, determining whether a store in the plurality of stores is retiring in a current cycle;
   determining that the store is retiring in the current cycle;
   thereafter, detecting the store as the retiring store;
   determining that no stores in the plurality of stores are retiring in the current cycle; and
   thereafter, holding the load request in the load queue until at least a next cycle.

4. The method of claim 1 further comprising:
determining a load-hit-store ordering hazard exists for the load request; and
thereafter encoding the location of the matching store in an entry for the load request in the load queue to form the hazard pointer.

5. A computer-readable storage device storing program instructions which when executed by a computer system cause the computer system to execute a method comprising:
receiving a plurality of stores into a store queue, wherein each store is a result from an execution unit, and wherein the plurality of stores are destined for at least one memory address;
determining whether a new store received at the store queue is a synchronizing operation;
in response to determining that the new store is not a synchronizing operation, determining that the new store has a memory address that matches a memory address of a store that is present in the store queue; and
thereafter, marking the new store as a most recent store the memory address to form a set of marked stores, wherein each unique memory address referenced by a store in the store queue has only one marked store indicating that the only one marked store is the most recent store for a unique memory address and wherein the program instructions for marking the new store as the most recent store for the memory address comprises:
setting a new recent load bit that, when set, indicates the most recent store; and
clearing an old recent load bit for all other stores having a same unique memory address such that only one store has a recent load bit set for each unique memory address;
in response to determining that the new store is a synchronizing operation, setting a new recent load bit for the synchronizing operation and clearing old recent load bits for all other stores in the store queue, such that the set of marked stores consists of only the synchronizing operation;
receiving a load request in a load queue;
thereafter, comparing an address in the load request against addresses for only the set of marked stores in the store queue;
identifying that the address in the load request matches a matching store in the set of marked stores;
thereafter, setting a hazard bit associated with the load request and encoding a location of the matching store in the load queue for the load request to form a hazard pointer, wherein the load request will not be processed when the hazard bit is set;
detecting a retiring store in the plurality of stores retiring;
thereafter, comparing the hazard pointer with the retiring store;
identifying that the hazard pointer matches the retiring store; and
thereafter, clearing the hazard bit.

6. The computer-readable storage device of claim 5, wherein the program instructions for marking the new store as the most recent store for the memory address further comprise program instructions for:
setting a recent load bit, wherein the recent load bit, when set, indicates the most recent store that a load would need to wait for in order to proceed.

7. The computer-readable storage device of claim 5 further comprising program instructions for:
identifying that the hazard bit is set;
thereafter, determining whether a store in the plurality of stores is retiring in a current cycle;
determining that the store is retiring in the current cycle;
thereafter, detecting the store as the retiring store;
determining that no stores in the plurality of stores are retiring in the current cycle; and
thereafter, holding the load request in the load queue until at least a next cycle.

8. The computer-readable storage device of claim 5 further comprising program instructions for:
determining that a load-hit-store ordering hazard exists for the load request; and
thereafter, encoding the location of the matching store in an entry for the load request in the load queue to form the hazard pointer.

9. A system comprising:
a processor;
a store queue for the processor, wherein the processor is configured to:
receive a plurality of stores into a store queue, wherein each store is a result from an execution unit, and wherein the plurality of stores are destined for at least one memory address;
determine whether a new store received at the store queue is a synchronizing operation;
in response to determining that the new store is not a synchronizing operation, determine that the new store has a memory address that matches a memory address of a store that is present in the store queue; and
thereafter, mark the new store as a most recent store the memory address to form a set of marked stores, wherein each unique memory address referenced by a store in the store queue has only one marked store indicating that the only one marked store is the most recent store for a unique memory address and wherein in marking the new store as the most recent store for the memory address the processor is further configured to:
set a new recent load bit that, when set, indicates the most recent store; and
clear an old recent load bit for all other stores having a same unique memory address such that only one store has a recent load bit set for each unique memory address;
in response to determining that the new store is a synchronizing operation, setting a new recent load bit for the synchronizing operation and clearing old recent load bits for all other stores in the store queue, such that the set of marked stores consists of only the synchronizing operation;
receive a load request in a load queue; thereafter, compare an address in the load request against addresses for only the set of marked stores in the store queue;
identify that the address in the load request matches a matching store in the set of marked stores;
thereafter, set a hazard bit associated with the load request and encoding a location of a matching store in the load queue for the load request to form a hazard pointer, wherein the load request will not be processed when the hazard bit is set;
detect a retiring store in the plurality of stores retiring;
thereafter, compare the hazard pointer with a retiring store;
identify that the hazard pointer matches the retiring store; and
thereafter, clear the hazard bit.

10. The system of claim 9, wherein in marking the new store as the most recent store for the memory address the processor is further configured to set a recent load bit, wherein the recent load bit, when set, indicates the most recent store that a load would need to wait for in order to proceed.

11. The system of claim 9, wherein the processor is configured to:
   identify that the hazard bit is set;
   thereafter, determine whether a store in the plurality of stores is retiring in a current cycle;
   determine that the store is retiring in the current cycle;
   thereafter, detect the store as the retiring store;
   determine that no stores in the plurality of stores are retiring in the current cycle; and
   thereafter, hold the load request in the load queue until at least a next cycle.

12. The system of claim 9, wherein the processor is configured to:
   determine that a load-hit-store ordering hazard exists for the load request; and
   thereafter encode the location of the matching store in an entry for the load request in the load queue to form the hazard pointer.

* * * * *